United States Patent [19]

Timms

[11] Patent Number: 4,952,304

[45] Date of Patent: Aug. 28, 1990

[54] REMOVAL OF CATALYST RESIDUES

[75] Inventor: Donald G. Timms, Beaulieu, England

[73] Assignee: Enichem Elastomers Ltd., Southampton, England

[21] Appl. No.: 246,276

[22] Filed: Sep. 19, 1988

[30] Foreign Application Priority Data

Sep. 22, 1987 [GB] United Kingdom ............... 8722235

[51] Int. Cl.$^5$ .............................................. C10G 17/04
[52] U.S. Cl. ................................ 208/251 R; 208/292
[58] Field of Search .......... 208/179, 245, 248, 251 R, 208/292, 297, 298; 585/853, 868, 820; 528/490

[56] References Cited

U.S. PATENT DOCUMENTS

| | | | |
|---|---|---|---|
| 2,893,982 | 7/1959 | Campbell | 528/486 |
| 3,531,448 | 9/1970 | Johnson | 528/487 |
| 3,567,795 | 3/1971 | Ishikawa | 585/809 |
| 3,780,137 | 12/1973 | Hassell | 528/483 |
| 3,780,138 | 12/1973 | Hassell | 528/483 |
| 3,793,306 | 2/1974 | Farrar et al. | 528/487 |
| 3,793,307 | 2/1974 | vault | 528/487 |
| 4,098,991 | 6/1978 | Kang | 528/492 |
| 4,362,650 | 12/1982 | Chauvin et al. | 585/512 |
| 4,567,251 | 1/1986 | Balas | 528/483 |
| 4,595,749 | 6/1986 | Hoxmeier | 528/483 |
| 4,618,413 | 10/1986 | Overfield | 208/251 R |
| 4,659,684 | 4/1987 | Fish | 208/251 R |
| 4,808,299 | 2/1989 | Latimer et al. | 208/251 R |

FOREIGN PATENT DOCUMENTS

| | | |
|---|---|---|
| 3520103 | 11/1986 | Fed. Rep. of Germany . |
| 1190714 | 10/1959 | France . |
| 523111 | 8/1976 | U.S.S.R. . |
| 788967 | 1/1958 | United Kingdom . |
| 1402570 | 8/1975 | United Kingdom . |
| 1405784 | 9/1975 | United Kingdom . |
| 2157706 | 10/1985 | United Kingdom . |

Primary Examiner—Glenn Caldarola
Assistant Examiner—William C. Diemler
Attorney, Agent, or Firm—Cushman, Darby & Cushman

[57] ABSTRACT

A process for the removal of contaminating residues of a homogeneous catalyst comprising a hydrocarbon soluble compound of a transition metal from Group VIII of the Periodic Table and a metal alkyl or alkyl halide cocatalyst from a liquid hydrocarbon reaction product comprises treating the contaminated product with an aqueous solution of a silicate, borate or carbonate and separating and recovering the hydrocarbon phase.

Residues of oligomerization catalysts, polymerization catalysts and hydrogenation catalysts are removable by this process, especially nickel, cobalt, iron, aluminium and halogen residues.

4 Claims, No Drawings

REMOVAL OF CATALYST RESIDUES

This invention relates to a process for the removal of catalyst residues from a liquid hydrocarbon reaction product. In one aspect, the invention relates to the removal of catalyst residues from a polymer solution, especially a highly viscous polymer solution or "cement".

Nickel or cobalt based catalysts find wide application in hydrocarbon chemical processes, for example in the oligomerisation of olefins, in the manufacture of diene polymers and in the modification of unsaturated polymers, e.g. random or block styrene-butadiene copolymers, by hydrogenation. Such catalysts may be heterogeneous, e.g. nickel on kieselguhr or Raney nickel, or homogeneous as where a nickel or cobalt compound is reduced with an organometallic compound. Irrespective of the particular catalyst that is used, it is generally necessary, if not essential, to remove any traces of catalyst remaining after the process has been carried out, to reduce adverse effects on the product, e.g. discolouration or reduced resistance to oxidation. Removal is particularly difficult where the catalyst used is homogeneous and has been produced by reduction of a hydrocarbon soluble salt or complex of nickel, cobalt or iron with an organometallic compound cocatalyst, such as an aluminium alkyl or lithium alkyl since the active species is soluble, or, possibly, colloidal and thus cannot be removed from the reaction medium by filtration.

Simple washing with water or aqueous alkali is ineffective because a gelatinous alumina precipitate may be formed together with chlorinated hydrocarbon byproducts. Consequently a diversity of methods for the removal of catalyst residues has been described in the literature or used in manufacturing processes.

An early process for decolourising hydrogenated butadiene polymers obtained using a nickel hydrogenation catalyst, by treatment with a carboxylic acid or mineral acid is described in U.S. Pat. No. 2,893,982. In practice, nickel and aluminium residues may be removed using dilute $H_3PO_4$ or dilute $H_2SO_4$. U.S. Pat. No. 3,531,448 describes a process for the removal of a nickel hydrogenation catalyst residue from a hydrogenated polymer in hydrocarbon solvent, by treating with an aqueous solution of ammonium phosphate and then separating the resulting nickel and aluminium phosphates. U.S. Patent Nos. 3,780,137 and 3,780,138 describe the removal of nickel from a synthetic organic polymer by treatment with carbon monoxide ('137) or an oxidant and citric acid ('138). The former involves the formation of poisonous carbonyls and the latter requires large volumes of extractant, relatively long extraction times and phase separation is not sharp. U.S. Pat. Nos. 3,793,306 and 3,793,307 describe the removal of aluminium reduced organo nickel catalysts by the use of ammonium phosphate and either a thiuram polysulphide ('306) or molecular oxygen/molecular oxygen containing oxidant ('307). U.S. Pat. No. 4,098,991 describes a nickel catalyst removal process using dimethyl glyoxime U.S. Pat. No. 4,595,749 describes a method for separating metal catalyst contaminants from organic polymers by treating with a dicarboxylic acid and an oxidant which forms an insoluble metal compound, to remove the contaminating metal (iron, nickel, cobalt, lithium and/or aluminium). A passification process for treating solutions of hydrogenated polymers or copolymers of conjugated dienes contaminated with nickel (o) residues is described in U.S. Pat. No. 4,567,251. A pressure filtration process, using $H_3BO_3$ or $B_2O_3$ adsorbent, for removing catalyst residues from polymer solutions or melts is described in German Ofen. DE3,520,103. The purification of oligomerised olefins containing dissolved nickel, aluminium and chlorine derivatives by treatment with oxygen or a gas containing oxygen, anhydrous ammonia and a solution of an alkali metal hydroxide, is described in G.B. Patent Application No. 2,157,706.

Many of the above processes have disadvantages and the lengthy time scale of the patents referred to above, spanning 15 to 20 years, demonstrates the difficulty of finding an effect-v½e solution to the problem. One difficulty associated with some techniques is the need to reoxidise reduced transition metal present in the catalyst residue to a state in which it can be removed. This may be achieved by acidifying the mixture and then admitting oxygen. However this practice is undesirable since any excess could interfere with other aspects of the process or present a hazard, although controlled addition of an oxidant such as hypochlorite is said to be quite effective. Some processes are expensive both in terms of materials and equipment employed and present According to the present invention, a process for removing contaminating catalyst residues from a liquid hydrocarbon reaction product containing residues of homogeneous catalyst, comprising a transition metal compound from Group VIII of the Periodic Table and a metal alkyl or alkyl halide cocatalyst, comprises treating the contaminated liquid product with an aqueous solution of a silicate, borate or carbonate and separating and recovering the hydrocarbon phase.

The process is particularly effective for the removal of nickel, cobalt, iron, aluminium and halogen residues. An important advantage of the process is that only small volumes of aqueous solution are needed to be effective, for example 0.25% v/v based on the hydrocarbon reaction product. Thus, in contrast to many other catalyst removal processes, only minimal amounts of water are required, obviating the need to remove, and dispose of, large volumes of wash liquor.

Alkali metal silicates (sodium silicate or potassium silicate) are preferred since these are readily soluble in water, inexpensive and easily obtained. Furthermore by an appropriate post treatment step, typically introduction of an acid, a tough gel of dense granules or flock-like particles, may be formed which is both easy to remove by filtration and easy to dispose of. Preferably the base: $SiO_2$ weight ratio (e.g. $Na_2O: SiO_2$) in the silicate is up to 1:3. Thus lower silica ratios are preferred. Examples of other suitable aqueous solutions are sodium borate solution and potassium carbonate solution. The preferred concentration of the aqueous solution is 10–30% w/v since this facilitates removal and disposal. The amount of solution used depends on the amount and type of catalyst residue to be removed and is readily determinable by experiment. Normally only small amounts are required.

The aqueous solution may be dispersed, if desired, on a porous support, such as pumice, but is remarkably effective when simply added in small quantity to the liquid hydrocarbon and dispersed for a period. The liquid hydrocarbon product may, if desired, be treated with reagent(s), for example, acetic acid, ammonia or an amine and oxygen may be admitted to effect oxidation of transition metal present in the catalyst, before or after treatment by the process of the present invention. A dispersant, such as an ethoxylated fatty ester or a fatty acid salt may be used, if desired.

After a short period, e.g. several minutes, the hydrocarbon phase is separated and recovered. This may be achieved by separating from the aqueous phase, for example by settling, centrifugation, hydrophobic filtration or flash evaporation. Where a silicate solution has been used, an acid may be introduced to convert the silicate to a tough gel, as described earlier, separable by filtration methods. A further method of separation is to remove the bulk, or all, of the water present by boiling off a portion of the hydrocarbon solution.

The process of the invention may be used to remove the transition metal residues (and e.g. aluminium and halogen residue) from any liquid hydrocarbon but, in practice, is useful for removing such residues from liquid hydrocarbon reaction products obtained using a homogeneous catalyst for the reaction concerned. Examples of such reactions are the oligomerisation of olefins (see, e.g. G.B. Patent No. 1,240,992), the polymerisation of conjugated dienes using cobalt or nickel based coordination catalysts (see e.g. "Kirk Othmer" Encyclopedia of Chemical Technology 3rd Ed. John Wiley & Sons, New York 1978, Volume 18 pages 554–557) and the modification, by hydrogenation, of partially saturated precursor polymers. Examples of such precursor polymers are random styrene-butadiene copolymer, block styrene-butadiene copolymer, polybutadiene, polyisoprene and isoprene-butadiene copolymer. In such precursor polymers the unsaturated diene monomer may be polymerised in several configurations (cis, trans, vinyl and 3,4) depending on the polymerisation catalyst and the conditions used. Hydrogenation is commonly used to modify the properties of the precursor polymer, as in the preparation of thermoplastic elastomers more resistant to oxidation.

Variation of the monomer composition in the polymer, the stereostructure of the diene portion and the degree of hydrogenation gives the polymer producer great versatility and enables polymers having a wide variety of physical properties, ranging from plastic to elastomeric to be manufactured. In some cases, catalyst residues from the polymerisation reaction may be employed in the subsequent hydrogenation reaction before removal. In other cases a hydrogenation catalyst employing catalyst components different from those used in the polymerisation reaction, is used. For example, where a diene polymer or copolymer (e.g. SBR) has been prepared using a lithium based catalyst (e.g. a lithium alkyl or dialkyl) the subsequent hydrogenation reaction may be carried out using a homogeneous hydrogenation catalyst based on a nickel or cobalt compound. Numerous examples of such catalysts have been described, see, for example, U.S. Pat. No. 3,531,448 or the other references quoted above.

The invention is illustrated by the following Examples:

EXAMPLES 1-5

In these Examples, 1-5, 200 ml portions of a polymer solution in cyclohexane containing approximately 12% of a hydrogenated styrene-butadiene-styrene block copolymer and a catalyst complex containing about 250 ppm of nickel and 300 ppm aluminium, based on polymer were charged under hydrogen to a 1 liter glass reactor equipped with paddle stirrer and baffle and the reactor contents heated to 70° C. The extracting solution indicated was added to the stirred polymer cement by syringe. After blending, the reactor content was cooled and centrifuged to remove the aqueous phase except where stated otherwise. The recovered polymer was ashed and analysed for nickel and aluminium content.

EXAMPLE 1

The extracting solution added was a mixture of 0.5 ml of an aqueous 20% w/v potassium silicate solution containing 1% w/v ethoxylated fatty acid and 0.2 ml NaOCl and this was blended for 20 minutes with the polymer solution. The colour of the catalyst complex was completely removed after 1½ minutes. The recovered polymer contained 4 ppm Ni, 24 ppm Al.

EXAMPLE 2

This was a repeat of Example 1 except that after blending 0.2 ml glacial acetic acid was added to gel the silicate solution. Temperature was maintained at 70° C. for 1 hour, by which time the bulk of the silicate had settled out of suspension. The polymer cement was filtered through a kieselguhr pad. Recovered polymer contained 7 ppm Ni, 32 ppm Al.

EXAMPLE 3

The extracting solution added was a mixture of 0.5 ml of an aqueous 20% w/v sodium borate ($NaBO_2$) solution containing 1% ethoxylated fatty acid and 0.2 ml NaOCl and this was blended for 10 minutes with the polymer solution. Recovered polymer contained 2 ppm Ni, 15 ppm Al.

EXAMPLE 4

The extracting solution added was a mixture of 0.5 ml of an aqueous 20% w/v $K_2CO_3$ solution containing 1% stearic acid and 0.2 ml Na OCl solution. Recovered polymer contained <2 ppm Ni, 15 ppm Al.

EXAMPLE 5

This was a repeat of Example 4 except that 0.2 ml 30% $H_2O_2$ was used in place of Na OCl. Polymer contained 3.5 ppm Ni and 12 ppm Al.

EXAMPLES 6-10

In these examples a 20% w/v aqueous solution of potassium silicate containing 1% w/v of a dispersing agent was employed as extracting solution.

EXAMPLE 6

The 1 liter reactor was purged with dry hydrogen then 30 ml of live cement containing polybutadiene from a hydrogenation reaction were introduced. The cement contained 8%polymer solids 25 ppm of Nickel and 40 ppm of Aluminium as catalyst complex. The reactor contents were heated to 55° C. and stirred, then 2 ml of silicate solution was added. The brown colour of the cement rapidly faded to mid grey, which colour persisted even after 20 minutes stirring. As the cement had been made some time previously it was inferred that the colour was due to colloidal nickel from decomposition of the catalyst complex. Whatever the nature of the colouring matter it did not decoolourise when ammonia and air were injected into the reactor. As heating and stirring continued water was transferred from the cement to the reactor lid, where it condensed and remained. After 40 minutes, stirring was stopped and the reactor contents were allowed to settle. A dense grey flock quickly formed and collected in the base of the reactor. The cement was clear and virtually colourless. This was separated and analysis of the recovered polymer showed this to contain <20 ppm ash and 4.5 ppm nickel.

EXAMPLE 7

300 ml of dry oxygen free cyclohexane was charged to a 1 liter hydrogen purged reactor. A mixture consisting of 0.1 mM cobalt octoate and 0.5 mM ethyl aluminium sesquichloride was added followed by 1 ml of the silicate solution. Blending was carried out for 20 minutes at 21° C. The blend was allowed to separate then portions of the cyclohexane were analysed. Results were: ash <50 ppm, Co 2 ppm, Cl <10 ppm.

EXAMPLE 8

A 1-liter reactor was charged with 300 ml of dry, oxygen free cyclohexane under an atmosphere of hydrogen. A mixed hydrogenation catalyst containing 0.05 mM of nickel versatate and 0.4 mM of aluminium alkyl was added to the stirred solvent, which assumed a deep brown colour. 1 ml of the silicate solution was added and blended for 10 minutes at room temperature (20° C.). After allowing the blend to settle a 20 ml portion of the cyclohexane was analysed. The ash content was less than 0.2 mg and the nickel content was below 1 ppm. The separated silicate was brown-grey suggesting that unoxidized nickel had been removed by the treatment.

EXAMPLE 9

Using the same quantity of cyclohexane and the same amount of catalyst as in Example 6, the effect of oxidizing the catalyst before extraction was examined. The experiment was carried out at 55° C. 0.1 ml glacial acetic acid was added and allowed to react for a few minutes. Some fading of the brown colour was noted but the solution did not decolourise. Injection of 10 ml air into the reactor resulted in rapid disappearance of colour. Two 1 ml portions of silicate solution were added with an interval of 10 minutes between additions whilst the reactor contents were stirred vigorously. The silicate separated rapidly as small hard granules of gel. After settling of insoluble matter 20 ml of the cyclohexane was analysed. The ash content was less than 0.2 mg and the nickel content 4 ppm.

EXAMPLE 10

Example 6 was repeated but at 55° C. and stirring continued for 30 minutes. The nature of the reactor design caused water to condense on the lid, where it remained. When blending was stopped large brown flocks of silicate rapidly formed and settled, leaving the cyclohexane completely clear and colourless.

In Examples 7-10, cyclohexane was used to simulate extraction of residues from hydrocarbon solutions, for expediency. The effect is however exactly the same as if a polymer solution had been used.

I claim:

1. A process for the removal of contaminating residues of a homogeneous hydrogenation catalyst comprising a hydrocarbon soluble compound of nickel and a metal alkyl or alkyl halide catalyst from a hydrogenated polymer solution, wherein the polymer solution is treated with an aqueous solution of a silicate, borate or carbonate and the hydrocarbon phase is separated and recovered.

2. A process according to claim 1, wherein the polymer solution is treated with an aqueous solution of potassium or sodium silicate, borate or carbonate.

3. A process according to claim 2, wherein the polymer solution is treated with a potassium or sodium silicate solution and an acid is introduced to convert the silicate residues to a gel.

4. A process according to claim 1, wherein the polymer solution is one obtained by the hydrogenation of a random styrene-butadiene copolymer, block styrene-butadiene copolymer, polybutadiene, polyisoprene or isoprene-butadiene copolymer.

* * * * *